(12) United States Patent
Girod et al.

(10) Patent No.: US 9,228,836 B2
(45) Date of Patent: Jan. 5, 2016

(54) INFERENCE OF VEHICULAR TRAJECTORY CHARACTERISTICS WITH PERSONAL MOBILE DEVICES

(71) Applicant: Cambridge Mobile Telematics, Cambridge, MA (US)

(72) Inventors: Lewis D. Girod, Arlington, MA (US); Hari Balakrishnan, Belmont, MA (US); Samuel Ross Madden, Newton, MA (US)

(73) Assignee: Cambridge Mobile Telematics, Cambridge, MA (US)

( * ) Notice: Subject to any disclaimer, the term of this patent is extended or adjusted under 35 U.S.C. 154(b) by 0 days.

(21) Appl. No.: 13/832,456

(22) Filed: Mar. 15, 2013

(65) Prior Publication Data
US 2014/0278206 A1 Sep. 18, 2014

(51) Int. Cl.
*G01P 15/00* (2006.01)
*G01C 15/00* (2006.01)
*G01P 15/08* (2006.01)
*G01C 21/16* (2006.01)
*G01C 21/20* (2006.01)
*G01C 21/10* (2006.01)

(52) U.S. Cl.
CPC .............. *G01C 15/00* (2013.01); *G01C 21/165* (2013.01); *G01P 15/0891* (2013.01); *G01C 21/10* (2013.01); *G01C 21/20* (2013.01)

(58) Field of Classification Search
USPC ............................................ 702/94, 141, 150
See application file for complete search history.

(56) References Cited

U.S. PATENT DOCUMENTS

| 5,961,571 | A | * | 10/1999 | Gorr et al. ...................... 701/494 |
|---|---|---|---|---|
| 6,532,419 | B1 | | 3/2003 | Begin et al. |
| 8,423,255 | B2 | | 4/2013 | Padmanabhan et al. |
| 2002/0177947 | A1 | | 11/2002 | Cayford |
| 2005/0128106 | A1 | * | 6/2005 | Nakaishi et al. .............. 340/988 |
| 2006/0111819 | A1 | * | 5/2006 | Servera Serapio et al. ..... 701/28 |
| 2007/0207840 | A1 | * | 9/2007 | Kurauchi et al. .......... 455/569.2 |
| 2008/0144849 | A1 | * | 6/2008 | Abe et al. ..................... 381/71.4 |
| 2008/0255722 | A1 | | 10/2008 | McClellan et al. |
| 2010/0228482 | A1 | * | 9/2010 | Yonak ........................... 701/301 |
| 2011/0208426 | A1 | | 8/2011 | Zheng et al. |
| 2011/0208429 | A1 | | 8/2011 | Zheng et al. |

(Continued)

FOREIGN PATENT DOCUMENTS

| EP | 2469229 | 6/2012 |
|---|---|---|
| WO | 0161271 | 8/2001 |

(Continued)

OTHER PUBLICATIONS

Johnson et al. "Driving style recognition using a smartphone as a sensor platform"; 2011 14th International IEEE Conference on Intelligent Transportation Systems; pp. 1609-1615.

*Primary Examiner* — Paul D Lee
(74) *Attorney, Agent, or Firm* — Occhiuti & Rohlicek LLP (57) ABSTRACT

Accurate longitudinal acceleration, lateral acceleration (perpendicular to the principal direction of motion, and velocity, is inferred by processing raw data from a commodity three-axis accelerometer that may be oriented arbitrarily in a moving vehicle (or carried by a moving user), and whose orientation and position may change arbitrarily during the motion. The approach is applicable to a range of applications, including insurance telematics, driver behavior and risk assessment, and road surface quality assessment.

33 Claims, 2 Drawing Sheets

(56) References Cited

U.S. PATENT DOCUMENTS

| | | |
|---|---|---|
| 2012/0029811 A1 | 2/2012 | Garin |
| 2012/0232823 A1 | 9/2012 | Baggen et al. |
| 2012/0245839 A1 | 9/2012 | Syed et al. |
| 2012/0268601 A1* | 10/2012 | Yeh et al. .................. 348/148 |
| 2013/0035893 A1 | 2/2013 | Grokop et al. |
| 2013/0041585 A1 | 2/2013 | Czompo et al. |
| 2013/0060467 A1* | 3/2013 | Nash ......................... 701/500 |

FOREIGN PATENT DOCUMENTS

| | | |
|---|---|---|
| WO | 0171372 | 9/2001 |
| WO | 0218873 | 3/2002 |

* cited by examiner

INFERENCE OF VEHICULAR TRAJECTORY CHARACTERISTICS WITH PERSONAL MOBILE DEVICES

CROSS-REFERENCE TO RELATED APPLICATIONS

This application is related to U.S. application Ser. No. 13/687,479, titled "Telematics Using Personal Mobile Devices," filed on Nov. 28, 2012, which is incorporated herein by reference.

BACKGROUND

This invention relates to inference of vehicular trajectory characteristics with mobile computing devices, and in particular to inference of vehicular acceleration and velocity using commodity devices such as smartphones. The acceleration computed includes a longitudinal component in the principal direction of movement of the vehicle, and may be positive, zero, or negative (indicating deceleration), as well as a lateral component perpendicular to the longitudinal in the plane of movement. A noteworthy aspect of the invention is that it uses raw sensor data from a mobile device that is not in a known or fixed orientation in the vehicle, and allows the orientation and placement to change from time to time. The invention is battery-efficient and well-suited for battery-efficient operation on personal mobile devices such as smartphones.

Inference of characteristics of a vehicle's trajectory, including velocity and acceleration, has previously been addressed using inertial measurement and positioning systems. With inertial systems, accelerometers (e.g., one or multiple axis or degree of freedom linear and/or rotational accelerometers) that are rigidly placed or fastened to the vehicle in a known position and orientation have been used to determine velocity by numerically integrating acceleration signals. Positioning systems, such as the Global Positioning System (GPS), have been used to infer velocity. Integration of accelerometer signals may have technical limitations, for example, related to "drift" whereby a velocity or position estimate may have progressively increasing error. Inference of velocity characteristics using a positioning system may have technical limitations such that inference or detection of acceleration or rapid changes in velocity may be impossible because the reported velocity estimates may be smoothed, preventing sudden acceleration and deceleration events from being inferred.

Personal mobile devices, for example, smartphones, personal digital assistants, and the like may have integrated accelerometers and positioning system receivers. Use of such devices for inference of a vehicle's trajectory may have limitations, for example, related to an uncontrolled, unpredictable, and changing placement and orientation of the device relative to the vehicle, and related to high power consumption required for frequent acquisition of position estimates from a positioning system, particularly GPS.

SUMMARY

In a general aspect, this document discloses a method to produce accurate longitudinal acceleration (in the principal direction of motion), lateral acceleration (perpendicular to the principal direction of motion), and velocity, by processing raw data from a commodity three-axis accelerometer that may be oriented arbitrarily in a moving vehicle (or carried by a moving user), and whose orientation and position may change arbitrarily during the motion. This method is applicable to a range of applications including insurance telematics, driver behavior and risk assessment, and road surface quality assessment.

In another aspect, in general, a method for obtaining accurate longitudinal and lateral acceleration information, as well as velocity information, in a battery-efficient way, from a commodity mobile device such as a smartphone or mobile phone, without requiring a known or fixed placement and orientation. Additionally, the method includes automatically calibrating or adapting to variations between phones and the inevitable errors in the raw acceleration data caused by internal imperfections and external factors such as temperature. In some examples, this calibration and adaptation is achieved by processing three-axis accelerometer data augmented with occasional GPS-based velocity samples.

In another aspect, in general, a method for producing accurate longitudinal and lateral acceleration, as well as velocity estimates, from a three-axis accelerometer whose orientation and placement are unknown such that the orientation and placement may change during a drive because the device may be moved relative to the user or vehicle. In some examples, the method includes automatically inferring rest periods to estimate the orientation of the device relative to the direction of gravity, as well as the longitudinal axis of the vehicle, and use that to produce the desired results. In some examples, to estimate velocity, the method employs integration of corrected longitudinal acceleration values.

In another aspect, in general, a method for producing accurate longitudinal and lateral acceleration, as well as velocity estimates, from a three-axis accelerometer, guarding against spurious results caused by the movement of the device relative to the vehicle. The method includes inference of such movements and automatically detecting them as not corresponding to legitimate vehicular or user acceleration. In some examples, this method uses the three-axis acceleration data, optionally three-axis gyroscope data, and optionally information from the mobile phone about the current foreground application and whether a phone call is in progress. Additionally, this method can be used to detect when the user is engaged in potentially risky driving behavior, such as texting or dialing while driving.

In another aspect, in general, a method for classifying periods of time into three categories: (1) periods of time when the mobile device is not moving in a reference frame of the vehicle and the vehicle is in motion, and (2) periods of time when the mobile device is moving in a reference frame of the vehicle, is being carried by the user, or is not in the vehicle at all, and (3) periods of time when the mobile device is not moving in the reference frame of the vehicle and the vehicle is not moving. In some examples, the acceleration data is classified or segregated hierarchically into these three categories to produce accurate longitudinal and lateral acceleration and velocity estimates for periods of time corresponding to a particular category or categories.

In another aspect, in general, a method for producing accurate longitudinal and lateral acceleration, as well as velocity estimates, from a three-axis accelerometer even when the device traverses hills and slopes of unknown grades, across a range of speeds. In some examples, the method further handles variations in the values reported by the accelerometer (there are many reasons for such drift, including changes in the device's temperature across its typical operating range). In some examples, the method periodically or continuously estimates the gravity vector in the reference frame of the three-axis accelerometer, providing a method to correct for the slope on which the vehicle or user is traveling.

In another aspect, in general, a method for estimating rapid lateral and longitudinal acceleration for forensic purposes, such as to detect the direction and magnitude of collisions with the vehicle. In some examples, a collision report that represents rapid changes in acceleration or deceleration is output, and that report may include an estimate of the angle and speed prior to and/or at which the collision occurred.

In another aspect, in general, a method for combining velocity generated according to aspects outlined above with estimates of velocity produced by other means, such as from a positioning system (e.g., GPS) in devices on the phone or car. Periodic and/or on-demand estimates of longitudinal velocity from such means are combined with accelerometer-based estimates to increase accuracy of velocity estimates. In some examples, the timing of these estimates is determined in part by an estimate of the uncertainty in the velocity estimate derived only from acceleration.

In another aspect, the processing of the data to infer vehicular characteristics occurs after the entire drive has been completed, or on several minutes of data at a time.

In another aspect, in general, high-frequency acceleration data is pre-processed on a mobile device to produce summaries, which are transmitted to a server for further processing.

Other aspects include a device (e.g., a smartphone) configured to perform a method outlined above, or software (e.g., a smartphone app) stored on a non-transitory machine-readable medium for causing a data processor (or a client/server architected processing system) to perform the steps of a method outline above.

Advantages of one or more aspects include improved battery usage in a mobile device, for example, by limiting use of a energy-intensive positioning system such as GPS, limited or requiring no prior calibration or training for a device, and not requiring human input or intervention to produce accurate estimates of longitudinal and lateral acceleration and velocity. Other advantages include the ability of the accurate estimates to improve the quality of trajectory inference described in U.S. application Ser. No. 13/687,479, titled "Telematics Using Personal Mobile Devices.

Other features and advantages of the invention are apparent from the following description, and from the claims.

DESCRIPTION

Overview

Figure 1:
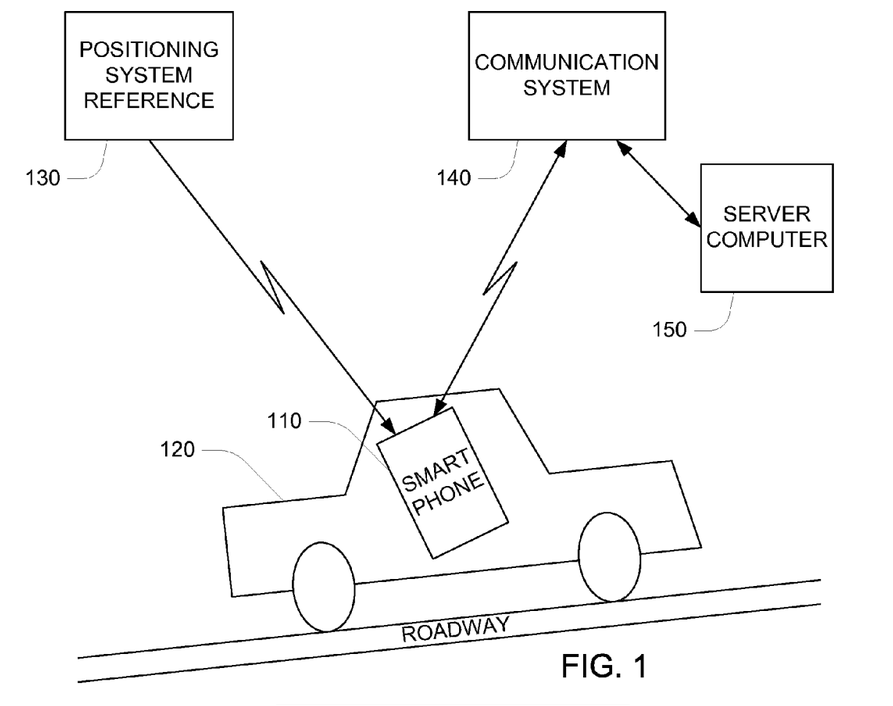
FIG. 1 is system diagram.

Referring to FIG. 1, an embodiment of a telematics system is described below in the context of use of a personal mobile device 110, such as a smartphone, that travels in a vehicle 120, to determine characteristics of a vehicle's trip though a road network, and in particular, to track velocity and acceleration profile through the road network. In this embodiment, the smartphone is not necessarily rigidly attached to the vehicle frame of reference; for example, the smartphone may be in the pocket of a driver or passenger in the vehicle, and may be moved from time to time, changing its placement and orientation. However, it should be understood that in other embodiments, other devices, which may be fixed or embedded in a vehicle, could be used in similar ways. In addition, the techniques may be applied to other tasks, for example, tracking other forms of transportation such as bicycling, bus travel, train travel, pedestrian walking, running, etc.

Figure 2:
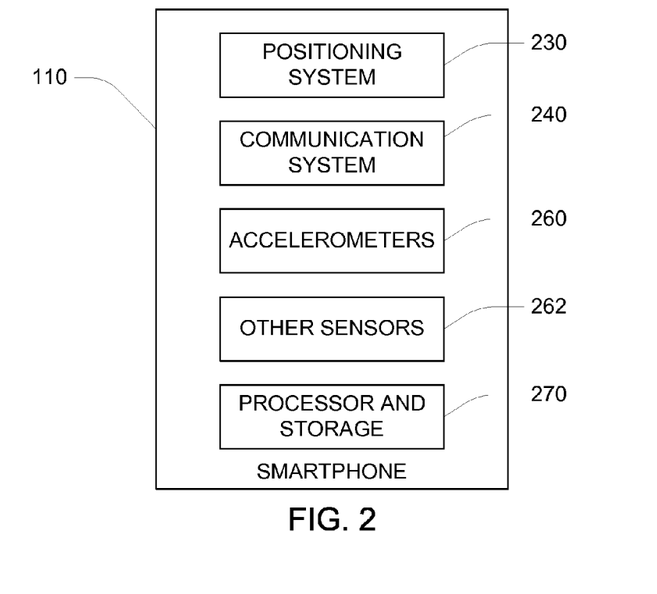
FIG. 2 is a block diagram of a smartphone.

Referring to FIG. 2, the mobile device has inertial sensors 260, for example, a three-axis accelerometer or a 6-degree-of-freedom (DOF) inertial measurement system (three-axis accelerometer and a gyroscope) fixed to the smartphone's frame of reference. Even though such inertial sensors are not fixed to the vehicle, they can nevertheless provide useful information about the vehicle's motion. The mobile device optionally has and makes use of yet other sensors 262, such as a compass, as well as a microphone, which may provide some information about the vehicle, for example, based on engine noise. The device 110 also includes a processor and storage 270, which in some embodiments performs various computations described below. The mobile device 110 optionally has a position measurement capability, for instance, using radios 240 that receive and/or send wireless signals with a fixed communication system 140 (see FIG. 1) such as cellular position estimation using a cellular radio, and/or a WiFi receiver for WiFi position estimation, and/or a positioning sensor 230 which receives position information with a positioning system reference 130 (see FIG. 1) such as via a Global Positioning System (GPS) receiver.

Generally, the smartphone executes an application that performs at least the task of acquiring the sensor data and possibly part (or all) of the task of inferring the vehicle's acceleration and/or velocity as it travels through a road network. This inference is based on the outputs of the three-axis accelerometers 260, optionally aided by outputs of the gyroscope, positioning system 230, and other sensors 262. In some examples, the techniques described in U.S. application Ser. No. 13/687,479, titled "Telematics Using Personal Mobile Devices," are used to augment the inferred velocity and/or acceleration information that is based on the accelerometers. In some examples, the results of the method described herein are used to augment the trajectory and mileage methods described in U.S. application Ser. No. 13/687,479.

The output of a three-axis accelerometer 260 is a time-series sequence of the form $\langle t_1, a_1 \rangle, \langle t_2, a_2 \rangle, \ldots, \langle t_n, a_n \rangle$ where each $t_i$ is a distinct timestamp and each $a_i$ is a three-tuple $\langle a_{xi}, a_{yi}, a_{zi} \rangle$, giving the x, y, z components of the acceleration sample estimated by the mobile device at time $t_i$. Note that these components are in the frame of reference defined by the mobile device, and will in general not be the same as the frame of reference of the vehicle or be aligned on any of the axes with the earth's gravity vector. In addition, this acceleration time-series may optionally be augmented with a time-series of the form $\langle t_1', \omega_1 \rangle, \langle t_2', \omega_2 \rangle, \ldots, \langle t_n', \omega_n \rangle$ where each $\omega_i$ gives the angular velocity components of the device as measured by a gyroscope at time $t_i'$. Further, this data may optionally be augmented with occasional velocity samples (or "fixes") obtained from an accurate position sensor such as GPS, at certain points in time. In general, the number of such velocity fixes may be much smaller than the number of acceleration samples because obtaining accurate velocity samples may be impossible or consume high power. This data may optionally be augmented with acoustic data from a microphone, and/or with data from a magnetic compass on the mobile device.

The method produces the following output streams:

$\langle T_1, \text{long\_acc}_1 \rangle, \langle T_2, \text{long\_acc}_2 \rangle, \ldots \langle T_n, \text{long\_acc}_n \rangle$
$\langle T_1, \text{lat\_acc}_1 \rangle, \langle T_2, \text{lat\_acc}_2 \rangle, \ldots \langle T_n, \text{lat\_acc}_n \rangle$
$\langle T_1, v_1 \rangle, \langle T_2, v_2 \rangle, \ldots \langle T_n, v_n \rangle$ which are the time series of the longitudinal acceleration (in the principal direction of the vehicle's motion), lateral acceleration (in the direction perpendicular to the principal direction of the vehicle's motion and on the plane of motion), and velocity of the vehicle.

Figure 3:
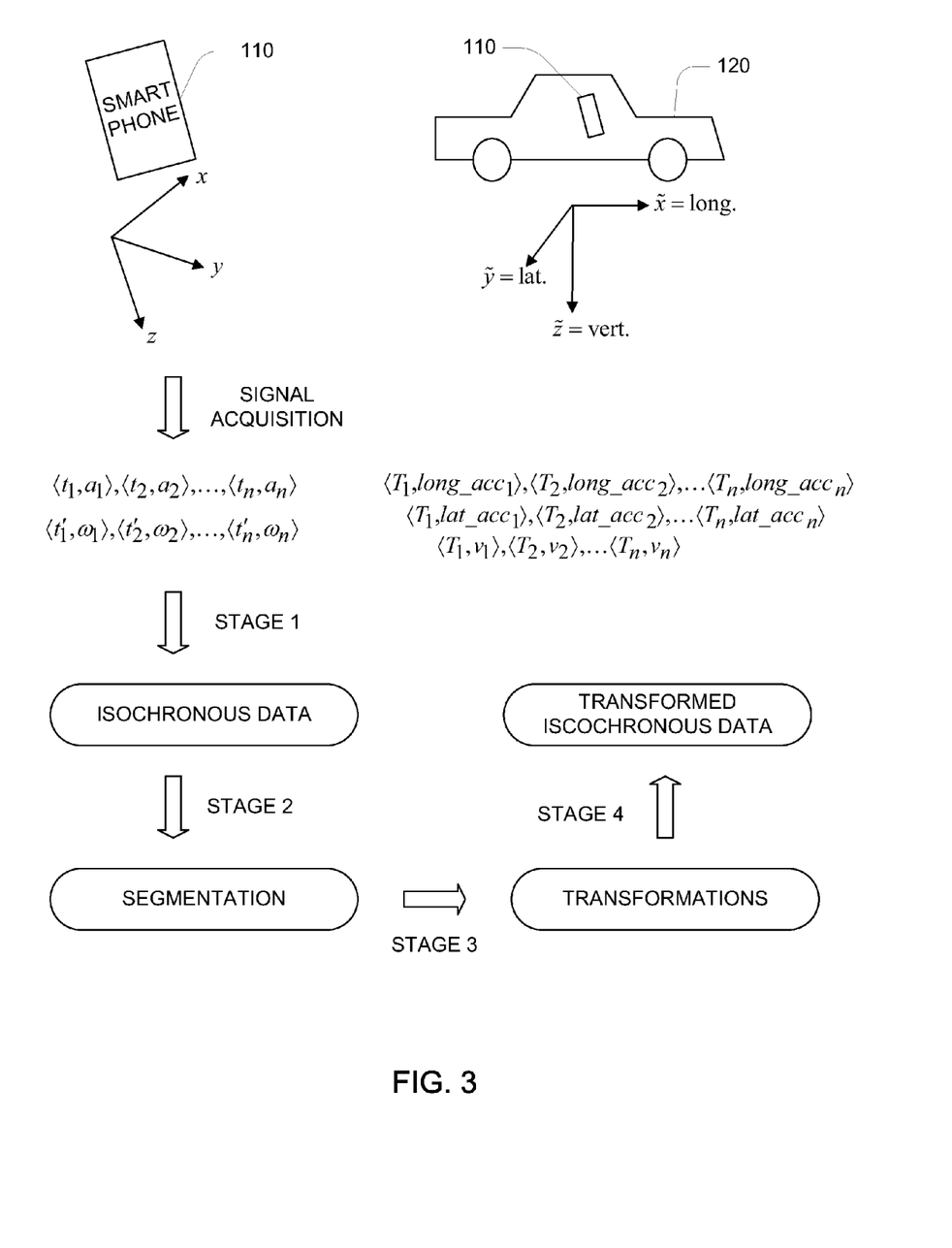
FIG. 3 is a signal flow diagram.

Referring to FIG. 3, we first provide an overview and summary of the different stages of the method. Then, we describe the internal details of each stage. The method proceeds in four main stages:

Stage 1: Pre-processing.
Stage 2: Segmentation.
Stage 3: Per-segment computation of the vehicle's acceleration in the principal direction of movement and in the perpendicular direction.
Stage 4: Computation of the vehicle's velocity.

The pre-processing is an optional step that makes the input time-series data isochronous (i.e., equally spaced in time). The reason this step is helpful is because the input data may not be sampled at equally-spaced times, or may have some outages. It is possible to apply the remaining stages without this stage, but pre-processing simples subsequent processing.

Stage 2 segments the isochronous data stream, producing non-overlapping segments in which the mobile device has a fixed orientation with respect to the reference frame of the vehicle. Note, however, that this orientation can be arbitrary and has to be inferred by the method. The data in each of these segments must be rotated into the vehicle's reference frame in order to estimate the correct vehicle acceleration and speed in the direction of travel.

Stage 3 runs on each segment determined in stage 2. This stage determines the rotation matrix to convert an acceleration vector in the mobile device's frame of reference to the vehicle's frame of reference. The three axes in the vehicle's frame of reference, when the vehicle is not on an incline, are (i) the direction of gravity, (ii) the longitudinal direction, and (iii) the lateral direction. Because the mobile device has a fixed orientation within each segment (from the previous steps), the desired rotation matrix for a given segment is unique.

Stage 3 has four key steps:
Step 3.1 Determine the direction of the earth's gravity.
Step 3.2 Determine the acceleration in the longitudinal direction, i.e., in the "forward" direction aligned with the vehicle's primary direction of motion.
Step 3.3 Determine the acceleration in the lateral direction.
Step 3.4 Correct for gradually changing phone orientations that may occur within one segment and for drives on inclines.

Stage 4 takes the longitudinal acceleration results from the previous stage and integrates it to compute vehicular velocity estimates.

Step 4.1 Identify periods where the vehicle is at rest, using the variance of the acceleration data.
Step 4.2 Identify other absolute velocity samples (e.g., from GPS or other sensors).
Step 4.3 Using known points as boundary conditions, estimate velocity as the integral of longitudinal acceleration.
Step 4.4 Between any two points of known time and location, the estimated velocity is corrected such that the mean velocity matches the mean velocity as determined by the most likely distance based on map data and the difference in time between points.

We now describe the details of each of the above stages.

Stage 1: Pre-Processing to Make the Data Isochronous.

There are several ways to make the data isochronous. On mobile device platforms where each sample is tagged with a timestamp, the input data is resampled at a defined rate and missing samples are interpolated. On platforms where sample times are not provided by the system, the method computes the median time difference between sample event arrival times, and then assume that the samples are sampled at that implied rate. It should be noted that several other methods of making the input isochronous may be used, e.g., using the mean time difference, or using the mean or median but ignoring gaps above a certain threshold value.

Stage 2: Segmentation

In this stage the method determines periods of time where the mobile device was moved relative to the vehicle. To detect movements of the phone, the method relies on noticing a significant change in the direction of gravity. The method takes a certain number of seconds of acceleration data, and over that window, computes the median value of each of the reported acceleration axes. Note that these median samples may not be from the same sample vector, but nonetheless the median values tend to be from similar vectors. Then the method computes the maximum distance between the median vector and the other sample vectors in the window. If this distance exceeds a threshold, then the device is considered to have been re-positioned. One may determine the threshold empirically or using regression, which is the preferred approach. One could also use online learning with some minimal supervision. When gyroscope data is available from the device, spikes in the gyroscope's time-series data are used to identify the likely times when the device was moved, and the resulting orientation changed. Similarly, a change in the orientation output of an inertial measurement unit (IMU) algorithm resident on the device also indicates a device movement (an IMU produces a three-axis orientation output—roll, pitch, yaw—generally derived from fusing acceleration, gyro, and compass data). If compass data is available, a sudden change in the reported direction (after filtering out noise) is indicative of device movement and orientation change of the device relative to the vehicle's frame of reference. The method uses these sensor inputs when they are available.

Whenever a candidate phone movement event has been detected, whether by a change in gravity, a large spike in angular velocity, or the output of the orientation output of an IMU algorithm, the method corroborates the motion by checking for a significant change in average orientation resulting from the motion. This check is performed averaging the vectors over several seconds before and after the suspected motion. If the angle between these two average vectors is below a threshold, and the original motion detection was small, then the motion detection is tagged as a false positive. This technique allows us to lower the threshold on the detection algorithm and increase our accuracy.

Stage 3: Compute the Vehicle's Acceleration in the Longitudinal and Lateral Directions.

Step 3.1 Determine the Direction of the Earth's Gravity

There are multiple possible ways to estimate the direction of the earth's gravity. One approach is to compute the average value of all the input vectors in the segment. (The x, y, and z components reported by the mobile device's accelerometer corresponding to the three-dimensional vector.) The average direction thus computed is an estimate of the "down" vector corresponding to the earth's gravity. This method will produce a correct answer if on average the vehicle does not have a net acceleration within the segment, and if on average the vehicle drives on level ground. Another method to estimate the direction of gravity is to compute the average vector during a rest period. This approach is more robust, but can be used only on a subset of all the input data. From time to time, the level assumption may not hold. In these cases, the output of trajectory mapping is used to determine the appropriate way to average the vectors to determine the "down" vector.

Step 3.2 Determine the Acceleration in the Longitudinal Direction

To compute the longitudinal direction, the method rotates the data such that the negative z axis points toward gravity as estimated in step 3.1, and then projects the data onto the x-y plane, and converts the resulting 2-D vectors into polar form <r,θ>. It then analyzes the distribution of θ values for these 2-D acceleration vectors. However, these initial θ values suffer from two sources of error. First, there is invariably some error in the estimate of gravity from step 3.1. This error can cause a bias in the resulting data that appears in the 2-D plane as a changing bias in the origin. In addition, most accelerometers have drift in the origin from various factors including temperature. These errors in the origin value would generally cause the values of θ to be incorrect. To handle this problem, the method computes the derivative of the raw acceleration vectors, and the computes the probability distribution of these derivatives. This step eliminates the (potentially drifted) origin as a factor, capturing the trend in direction more precisely.

The method then filters out "degenerate" values: when more or less at rest, accelerometers often report points with a change only in a single axis (e.g., x and y values are the same as the last point, but the z-value changes). These cases do not produce useful information; they are artifacts of the accelerometer hardware. The method removes these spurious points.

In the resulting distribution, there are typically four peaks about 90 degrees apart, corresponding to the axes of the vehicle. However, depending on the type of driving, the dominant peak may be either forward, reverse, left, or right. The method must therefore determine which of these 4 peaks corresponds to the longitudinal (forward) direction. To resolve this question, consider all points with known velocity (e.g., any available GPS samples with velocity or rest periods). Consider all pairs of points separated by 1 point. Then, for each of these intervals, integrate the acceleration along each of the 4 candidate directions, to estimate a total change in velocity over the interval, and compare it to the actual change in velocity (as determined by the available velocity samples at either end of the interval). For each candidate direction, accumulate the absolute error, weighted by the absolute value of the slope of the actual velocity change (dv/dt). This weighting puts more weight on cases where the change in velocity is more significant. Choose the direction with the lowest total weighted error as the longitudinal direction.

An alternate method to compute the longitudinal direction is to again compute the derivative of the acceleration time series (after eliminating the gravity component). Then, compute the distribution of the angles of these derivatives. The result will show a clear principal component in the forward direction of travel. The method selects the maximum value of this distribution and uses this value as the forward direction.

Step 3.3 Determine the Acceleration in the Lateral Direction

The lateral direction is the direction perpendicular to both gravity and the longitudinal directions. The acceleration component in this direction may be calculated easily because the total magnitude is known, and the values of two of the three components of acceleration have already been estimated.

Step 3.4 Correct for Gradually Changing Phone Orientations

In some cases the phone may gradually change orientation, e.g., if it is located on a slippery surface that allows it to rotate. In such cases, Step 3.2 will result in a slowly or suddenly varying orientation value. The method detects this situation by computing the principal rotation over smaller windows.

The method also includes corrections for inclinations encountered during a drive. As the vehicle drives, its inclination will change as it drives over hills and other slopes. As a result, the gravity vector changes over time in the reference frame of the vehicle. This change in the gravity vector will (erroneously) contribute a portion of the acceleration due to gravity to the lateral and longitudinal acceleration estimates, which in turn will cause drift and errors in the estimates. Estimating the true direction of gravity within the vehicle's reference frame is non-trivial because there is no clear distinction between legitimate acceleration of the vehicle and the acceleration component due to inclination. To address this challenge, the method assumes that changes in inclination occur over longer time scales than changes in vehicle acceleration, and that the bulk of the effect of gravity feeds into the longitudinal acceleration because most segments of road are not banked. The method therefore uses a smoothing filter to estimate the effect due to gravity with a large window. However, the method also takes into account rest periods, where the average vector is purely due to gravity. The smoothing function is applied to the longitudinal acceleration between rest intervals, and the portions near a rest interval are adjusted such that the final value of the smoothed function is equal to the unsmoothed value. The smoothed value is subtracted from the longitudinal acceleration to remove bias due to gravity.

Stage 4: Velocity Estimation

To estimate velocity, the method takes the longitudinal acceleration results from the previous stage and integrates them to compute vehicular velocity estimates. In this stage, the method first determines all potential absolute velocity samples, performs the intergration, and then post-corrects based on map data.

Step 4.1 Determining Rest Periods

A rest period is an interval of time when the vehicle was at rest, and therefore has an absolute velocity of 0. To determine a rest period, the method takes the acceleration data in windows of a few seconds each. It computes the variance of the 3-dimensional acceleration vectors over each such window. It then computes the distribution of the logarithms of resulting variance values. The log distribution tends to show multiple Gaussian components, which correspond to different vibration regimes experienced by the device. Empirically, vehicles in motion tend to experience variances in a measurable and known small range, so we fit a Gaussian model to the mode centered near that point and determine the fit parameters μ and σ. We then select the "rest-cutoff" value as a function of the μ and σ values and (for example, μ−2σ).

Step 4.2 Identifying Other Absolute Samples

Absolute velocity samples are acquired from other sources, such as periodic GPS samples, or using an audio analysis of engine noise (disclosed below). These are combined with the rest periods to form a complete set of velocity samples.

Dynamic inclusion of velocity data: Drift in velocity estimates grows quickly and "true" velocity reduces additive errors. There is, however, a cost to collecting an absolute reference (in particular an energy cost to use GPS). The method uses an online algorithm to determine when to acquire an absolute reference point. Define a counter at T seconds, and deduct 1 for each passing second. Reset the counter to T seconds whenever an absolute reference is used (e.g. GPS, audio, or rest period). In addition, every time the acceleration transitions from −a to +a or from +a to −a (where a is 1.5 m/s$^2$, for example) deduct a penalty from the counter (e.g., 20 seconds). This serves to increase the rate of reference points when there is a substantial swing in acceleration.

Step 4.3 Integrate to Estimate Velocity

Next consider the absolute velocity samples to be boundary conditions for the velocity estimate. The estimate defines the velocity to be known exactly at these points, and then computes an estimate over the points falling between adjacent velocity samples, based on the numeric integral of longitudinal acceleration. The values of the boundary conditions are used to determine a constant bias to the acceleration that forces the estimate to converge to the known velocity at the boundaries. For any pair of velocity samples spanning a period of unknown acceleration values (e.g. due to missing data), the velocity is not estimated. Once the method has produced longitudinal acceleration estimates, it computes velocity estimates. The method numerically integrates the acceleration using rest periods and occasional absolute velocity estimates as boundary conditions. These absolute velocity estimates can come from sources such as GPS or using an audio analysis of engine noise (disclosed below). Given two boundary velocities, the method computes the integral of the acceleration between those two points. The total change in velocity computed from the integral is compared to the change of velocity between the boundaries. The difference between these changes is considered to be a uniform drift in acceleration and is deducted or added uniformly to meet the two boundaries. If the velocity estimate ever drops below 0, the minimum velocity is assumed to be an intermediate boundary condition at 0 and the estimates bounded by this new intermediate point are recomputed.

4.4 Correction of Velocity Estimates Using Map-Matching Output from Trajectory Inference Method A map-matching approach, for example, as described in copending U.S. application Ser. No. 13/687,479, returns a most-likely map-matched trajectory corresponding to cellular or WiFi positioning data or intermittent GPS data. The method maps known time and location pairs collected from GPS onto the most-likely trajectory, and the distance along the trajectory between adjacent GPS points is computed. The timestamps associated with a GPS point provide the length of time over which such distance was traveled. Hence, one can compute the map-matched distance between successive points and divide by the time interval between the observations to estimate an average speed. Next, the mean of the estimated velocity is computed and compared to that based on GPS and the map-matched trajectory. If the correction is reasonably small, an adjustment function is applied to the velocity estimates to correct the mean value to match the value based on the map.

This adjustment is made by constructing a curve formed by the function $$\sqrt{\frac{n}{s-1}} \sqrt{\frac{s-1-n}{s-1}} \text{ for } n = 0, \ldots, s-1$$

where s is the number of points in the region. Other functions with a similar shape and properties could also be used.

Scale this function so that the integral of the function is equal to the difference between our estimate and the average velocity determined from the map, and add it into our estimate to correct it.

Finally, differentiate the corrected velocity estimates to construct a matching, corrected acceleration time series.

Audio Analysis for Velocity Determination.

The approaches described above, which make use of accelerometer data, can be augmented using audio data captured by the smartphone. The theory of operation underlying the audio-based velocity determination method is that the frequency of noise associated with driving (engine noise, road noise, etc) is proportional to the velocity of the vehicle. This is because the velocity is proportional to the rotation of the tires and any consistent vibrations that are correlated to wheel rotation will have this property of proportional frequency. This is true of both consistent road textures as well as properties of the engine and drivetrain, although the properties of the drivetrain are generally going to be more consistent over time. These properties of the drivetrain may be correlated to the rotation of the wheels (e.g., noise in the axles, bearings, constant velocity joints (front wheel drive), or transfer case (4-wheel drive). They may also be correlated to the rotation of the engine, e.g., belts, bearings, rotating parts, combustion noise, exhaust noise, transmission noise. Note that depending on the state of the transmission, the rotation of the engine may relate to velocity at a different scale than the wheels. Note also that the particular noise spectrum and signature will vary for different cars. This means that some form of calibration may be required, but on the other hand it also allows for a possible means of vehicle identification, which is often of value in a variety of applications.

Audio analysis methodology. The principle of analysis is to analyze a short-term-fourier-transform (STFT), represented as a spectrogram. First, sample the audio, then filter and downsample it; regardless of the audio sampling rate, apply a k th order butterworth filter at $f_1$ Hz, then downsample to $f_2$ Hz. The result is a maximum available frequency of F Hz (F=250 usually), which for privacy concerns is well below speech frequencies, so there should be no privacy concerns. However, the frequency content of engines tends to be well within this range. Once downsampled, compute the STFT using a narrow Hann window that covers W samples, and a wider 1024-point (e.g.) FFT to increase the frequency resolution, and a step of 50 samples to produce 10 spectra per second.

Then apply a frequency-tracking algorithm to locate and track the shifting frequency of a narrowband source in the data. This algorithm begins with the maximum magnitude frequency and tracks it by selecting successive maximum values from within a tight range around the previous estimate. Another approach is to use information from acceleration to guide the tracking; track multiple hypotheses concurrently using hints from acceleration to guide. This results in a time series of frequency over time, which we assume is proportional to velocity. Another approach is to apply frequency tracking to a power cepstrum of the FFT columns in the STFT, This approach is similar to the "cepstral coefficients" methods commonly used in speech recognition. A power cepstrum computes the FFT power spectrum of the log of the FFT power spectrum of the original signal. This method is used to coalesce harmonic energy and to more readily identify pitch changes.

Take the longitudinal acceleration computed previously and correlate it against short clips of the derivative of the frequency time series data. Select out clips where the correlation is the highest; use a least squares fit to compute the estimated scale factor from the acceleration data (units in $m/s^2$) to frequency, to determine the ratio to convert frequency to velocity.

Calibration process for audio: collect these "least noisy" frequency traces (i.e. those with highest correlation to acceleration measurements) and capture GPS data points concurrently with the audio. For each "good" trace segment, compute the ratio required to convert frequency to velocity. These ratios should form a distribution with several modes, where each mode corresponds to a gearing ratio. Record these gearing ratios for further use. In addition, collect the source audio data corresponding to each ratio and compute a summation of all of the spectra data for that ratio, first scaling each spectrum according to actual speed. This summation will give you a signature of the engine at that gearing ratio. This signature can be used to enhance the frequency-tracking algorithm as well as to identify the vehicle.

Once the gear ratios have been estimated for the vehicle, the ratios determined by fitting the measured acceleration to the derivative of the tracked frequency can be compared with the known ratios to find the nearest fit; that fit could be used to assume the known gear ratio and deduce the velocity from the frequency track.

The signatures can also be used to deduce the correct gear ratio: given the frequency track, assume a gear ratio and then scale the signature data to match the observed frequency. Then, compute the degree of correlation between the scaled signature spectrum and the observed spectrum. The correct gear ratio would be the one that has the highest correlation with the signature. This can be used to disambiguate cases where the match based on acceleration data is not decisive.

Signatures may also be used directly to improve detection. Rather than locating the maximum frequency magnitude in the tracking algorithm, instead the maximum correlation can be found, using scaled versions of the signature spectra.

Applications

The approaches described above can be used in a variety of applications. In one application, the derived motion data in the frame of reference of the vehicle is used in the task of tracking a vehicle. Note that the vehicle can be an automobile, a bicycle, a boat, etc. For example, in order to limit power or computation cost of using a positioning system such as GPS, the smartphone-derived data is used in a map-based tracking task. In some such examples, both longitudinal velocity data, as well as rotation about the vertical axis (i.e., vehicle turning), are used to track the vehicle's trajectory through the map. In some examples, position estimates are acquired at times that are based on the tracking using the smartphone accelerometer data, for example, when the system determines that there is a high uncertainty of the vehicle's location. In this way, higher accuracy of tracking of a vehicle can be obtained for a given amount of energy consumption (battery life) by avoiding frequent use of relatively power intensive radio transmissions.

In another application, the velocity estimates are recorded on the smartphone, and provided as a summary of the driving characteristics of the user (e.g., by periodic or on-demand uploading of summary data). In one example, the data may be used in various types of commercial relationships (e.g., contracts, usage-based or behavior-based insurance policies, etc.) established between one party (e.g., the driver and/or the owner of a vehicle) and another party (e.g., an insurance carrier, a vehicle owner, etc.), where the terms of the contract depend on the driving characteristics that are determined using the techniques described above.

Implementations

Implementations of the approaches described above may use software that includes instructions stored on non-transitory computer-readable media. The instructions are used to control operation of a data processor (e.g., a computer, a virtual machine) to perform some or all of the functions described above. For examples, such instructions control operation of a processor in a smartphone and/or operation of a server computer in communication with the smartphone. In some implementations, the instructions are smartphone are provided (e.g., as an "app") over a wireless network for installation on the smartphone.

It is to be understood that the foregoing description is intended to illustrate and not to limit the scope of the invention, which is defined by the scope of the appended claims. Other embodiments are within the scope of the following claims.

What is claimed is:

1. A method comprising inferring vehicular trajectory characteristics, said inferring comprising:
acquiring using a machine-implemented processor data representing a sequence of measurements of acceleration of a device traveling in a vehicle traversing a road network, the device being in an unknown and changeable orientation relative to the frame of reference of the vehicle in which the device is traveling;
forming during traversal of the road network by the vehicle using a machine-implemented processor associated with the device in the vehicle a plurality of time segments of the measurements of acceleration, wherein the orientation of the device relative to the vehicle when acquiring the data differs between at least some of the time segments and wherein forming the plurality of time segments comprises detecting times of substantial relative motion of the device relative to the vehicle, and forming the time segments between said detected times;
for each time segment of a plurality of time segments, using a machine-implemented processor,
determining data characterizing an orientation of the device relative to a frame of reference of the vehicle during that time segment,
forming motion-related data in the frame of reference of the vehicle during the time segment, and
determining data characterizing trajectory characteristics of the vehicle in the time segment; and
providing data characterizing trajectory characteristic of the vehicle determined from the data characterizing the trajectory characteristics in multiple of the time segments.

2. The method of claim 1 wherein determining data characterizing an orientation of the device comprises determining a time varying orientation within at least one of the time segments of the device relative to the frame of reference of the vehicle.

3. The method of claim 1 wherein determining data characterizing an orientation of the device in a time segment comprises determining a vertical direction.

4. The method of claim 3 further comprising using a distribution of sensed motion in a plane orthogonal to the vertical direction to determine a direction of travel of the vehicle.

5. The method of claim 1 wherein the device comprises a personal mobile device that is held or is on the person of a driver or passenger of the vehicle.

6. The method of claim 1 wherein the data characterizing trajectory characteristics of a vehicle comprise at least one of longitudinal acceleration, lateral acceleration, longitudinal velocity, and distance travelled of the vehicle.

7. The method of claim 1 wherein acquiring the data representing the sequence of measurements of acceleration of the device comprises measuring acceleration values on multiple axes using accelerometers in the device.

8. The method of claim 1 wherein the inferring further comprises:
accessing map data characterizing a road network;
processing the data characterizing the trajectory characteristics of the vehicle according to the map data to determine data characterizing traversal of the road network by the vehicle.

9. The method of claim 1 further comprising applying map traversal data in determining the data characterizing the trajectory characteristics of the vehicle.

10. The method of claim 1 wherein the inferring further comprises:
   acquiring data representing environmental characteristics of the device; and
   wherein determining the trajectory characteristic of the vehicle includes using the data representing the environmental characteristics.

11. The method of claim 10 wherein the data representing environmental characteristics includes data representing an acoustic environment of the vehicle, where said data provides information related to velocity of the vehicle.

12. The method of claim 1 wherein the inferring further comprises:
   acquiring data from a gyroscope on the device; and
   wherein determining the trajectory characteristic of the vehicle includes using the gyroscope data.

13. The method of claim 12 wherein the use of the gyroscope data is in the forming of the time segments.

14. The method of claim 12 wherein the use of the gyroscope data is in the forming of the motion-related data in the frame of reference of the vehicle during the time segment.

15. The method of claim 1 wherein the inferring further comprises:
   acquiring position or velocity data of the device using a radio or positioning sensor in the device; and
   wherein determining the trajectory characteristic of the vehicle includes using the position data.

16. The method of claim 15 further comprising determining when to acquire the position or velocity data at least in part according to the determined trajectory characteristics determined from the measurements of acceleration of the device.

17. The method of claim 15 further comprising determining when to acquire the position or velocity data at least in part according to the determined motion state of the device in the frame of reference of the vehicle.

18. The method of claim 15 further comprising:
   accessing map data characterizing a road network;
   processing the data characterizing the trajectory characteristics of the vehicle according to the map data to determine data characterizing traversal of the road network by the vehicle.

19. The method of claim 1 further comprising providing software to the device for execution on the device for causing a processor in the device to perform the inferring.

20. The method of claim 1 further comprising providing the data characterizing trajectory characteristic of the vehicle via a radio interface of the device.

21. The method of claim 20 wherein providing the data includes providing the data to a server computer and at least some of the steps of claim 1 are performed at said server.

22. The method of claim 1 further comprising providing the data characterizing the trajectory characteristics from the device for use in an insurance application.

23. The method of claim 1 further comprising providing the data characterizing the trajectory characteristics to a second party with a contractual relationship with a first party comprising at least one of a user of the device and party in control of the vehicle.

24. The method of claim 23 wherein the contractual relationship is governed at least in part according to trajectory characteristics of the vehicle.

25. The method of claim 23 further comprising forming the contractual relationship between the first party and the second party.

26. The method of claim 1 wherein forming the plurality of time segments comprises determining said segments such that the orientation of the device relative to the vehicle is relatively fixed as compared to changes of the orientation at transitions between said segments.

27. The method of claim 1 wherein, for each time segment of a plurality of time segments, the method further comprises determining whether there is a time interval in the time segment in which the vehicle is stationary.

28. The method of claim 27 wherein determining a time interval in which the vehicle is stationary uses a threshold picked from statistics of the measurements of acceleration of the device.

29. The method of claim 1 wherein the data characterizing trajectory characteristics includes at least one of (a) a path on a road network followed by the vehicle, (b) a velocity of the vehicle, and (c) an acceleration of the vehicle.

30. The method of claim 29 wherein measurements of acceleration of the device include measurements from at least one of an accelerometer and gyroscope fixed in the device.

31. A non-transitory machine-readable medium, storing software comprising instructions for causing a processor of a device to:
   acquire data representing a sequence of measurements of acceleration of the device traveling in a vehicle traversing a road network;
   form during traversal of the road network a plurality of time segments of the measurements of acceleration, such that the orientation of the device relative to the vehicle when acquiring the data differs between at least some of the formed time segments and wherein forming the plurality of time segments comprises detecting times of substantial relative motion of the device relative to the vehicle, and
   forming the time segments between said detected times;
   for each of a plurality of the time segments,
      determine data characterizing an orientation of the device relative to a frame of reference of the vehicle,
      form motion-related data in the frame of reference of the vehicle during the time segment, and
      determine data characterizing trajectory characteristics of the vehicle in the time segment; and
   provide data characterizing trajectory characteristic of the vehicle determined from the data characterizing the trajectory characteristics in multiple of the time segments.

32. A method comprising inferring vehicular trajectory characteristics, said inferring comprising:
   acquiring using a machine-implemented processor data representing a sequence of measurements of acceleration of a device travelling in a vehicle traversing a road network, the device being in an unknown orientation within the vehicle in which the device is traveling;
   determining using the machine-implemented processor associated with the device times at which the device changes orientation within the vehicle, at least some of the determined times being during motion of the vehicle;
   forming during traversal of the road network time segments of the measurements of acceleration by bounding the segments based on the determined times at which the device changes orientation within the vehicle; and
   for each segment of a plurality of the formed time segments, estimating an orientation of the device within the vehicle, and inferring the vehicular trajectory characteristics using the estimated orientation of the device and the acceleration-related measurements for the segment.

33. The method of claim 32 wherein determining the times at which the device changes orientation within the vehicle includes using at least one of (a) a change in a manifestation of gravity in the measurements of acceleration, (b) presence of a predetermined pattern of acceleration-related data, (c) presence of a predetermined pattern of gyroscope-related data, and (d) detection of sudden change in orientation in an orientation-related signal associated with the device.

* * * * *